(12) United States Patent
Fujisawa et al.

(10) Patent No.: US 11,714,225 B2
(45) Date of Patent: Aug. 1, 2023

(54) ILLUMINATION DEVICE

(71) Applicant: Japan Display Inc., Tokyo (JP)

(72) Inventors: Kouji Fujisawa, Tokyo (JP); Masahiko Kurihara, Tokyo (JP); Takashi Ota, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/568,086

(22) Filed: Jan. 4, 2022

(65) Prior Publication Data

US 2022/0120959 A1    Apr. 21, 2022

Related U.S. Application Data

(63) Continuation of application No. PCT/JP2020/015228, filed on Apr. 2, 2020.

(30) Foreign Application Priority Data

Jul. 8, 2019 (JP) ................. 2019-126963

(51) Int. Cl.
*F21V 8/00* (2006.01)

(52) U.S. Cl.
CPC .................. *G02B 6/0066* (2013.01)

(58) Field of Classification Search
CPC ............ G02B 6/0066; G02F 1/133603; G02F 1/133607; F21S 2/00
See application file for complete search history.

(56) References Cited

U.S. PATENT DOCUMENTS

2018/0327096 A1   11/2018  Lins
2021/0223624 A1*   7/2021  Zhang ............... G02F 1/133611

FOREIGN PATENT DOCUMENTS

| JP | 2009-054375 A | 3/2009 | |
| JP | 2018-130101 A | 8/2018 | |
| JP | 7121284 B2 * | 8/2022 | ............... F21S 2/00 |
| WO | WO-2020150867 A1 * | 7/2020 | ....... G02F 1/133603 |

OTHER PUBLICATIONS

Search Report issued in International Patent Application No. PCT/JP2020/015228 dated Jun. 16, 2020 and English translation of same. 6 pages.
Written Opinion issued in International Patent Application No. PCT/JP2020/015228 dated Jun. 16, 2020. 3 pages.

* cited by examiner

*Primary Examiner* — Donald L Raleigh
(74) *Attorney, Agent, or Firm* — K&L Gates LLP (57) ABSTRACT

According to an aspect, an illumination device includes: a plurality of light-emitting elements arrayed in a matrix along two directions; and a substrate on which the light-emitting elements are provided. The substrate has a plurality of partial regions. The light-emitting elements are arranged in the partial regions such that four light-emitting elements are arrayed in a two-by-two matrix along the two directions in each of the partial regions. Two light-emitting elements adjacent to each other in each of the partial regions are arranged at a first interval in one direction of the two directions. Two light-emitting elements adjacent to each other with a boundary of two partial regions adjacent to each other along the one direction interposed therebetween are arranged at a second interval in the one direction. The first interval is shorter than the second interval.

2 Claims, 5 Drawing Sheets

ILLUMINATION DEVICE

CROSS-REFERENCE TO RELATED APPLICATION

This application claims the benefit of priority from Japanese Patent Application No. 2019-126963 filed on Jul. 8, 2019 and International Patent Application No. PCT/JP2020/015228 filed on Apr. 2, 2020, the entire contents of which are incorporated herein by reference.

BACKGROUND

1. Technical Field

What is disclosed herein relates to an illumination device and an illumination device including a light guide member.

2. Description of the Related Art

As disclosed in Japanese Patent Application Laid-open Publication No. 2009-054375, an illumination device configured to illuminate a display panel from the rear surface thereof has been known.

In an illumination device having a configuration in which a plurality of point light sources such as bare chips that are lit based on the principle of light-emitting diodes (LEDs) are arranged to illuminate a display panel in a planar manner, a phenomenon called "prominent chips" occurs. The prominent chips is a phenomenon in which positions of the point light sources become significantly visible when the luminances at positions at which the point light sources are provided are significantly higher than luminances at other positions. This phenomenon causes deterioration in display quality.

For the foregoing reasons, there is a need for an illumination device and a light guide member that can reduce prominent chips.

SUMMARY

According to an aspect, an illumination device includes: a plurality of light-emitting elements arrayed in a matrix along two directions; and a substrate on which the light-emitting elements are provided. The substrate has a plurality of partial regions. The light-emitting elements are arranged in the partial regions such that four light-emitting elements are arrayed in a two-by-two matrix along the two directions in each of the partial regions. Two light-emitting elements adjacent to each other in each of the partial regions are arranged at a first interval in one direction of the two directions. Two light-emitting elements adjacent to each other with a boundary of two partial regions adjacent to each other along the one direction interposed therebetween are arranged at a second interval in the one direction. The first interval is shorter than the second interval.

According to an aspect, an illumination device includes: a plurality of light-emitting elements arrayed in a matrix; a substrate on which the light-emitting elements are provided; and an optical member that faces the substrate and on which light from the light-emitting elements is incident. The substrate has a plurality of partial regions. The light-emitting elements are arrayed in a two-by-two matrix in each of the partial regions. Two light-emitting elements adjacent to each other in each of the partial regions are arranged at a first interval in a first direction. Two light-emitting elements adjacent to each other with a boundary of two partial regions adjacent to each other along the first direction interposed therebetween are arranged at a second interval in the first direction. The optical member has a plurality of inclined surfaces. One of the inclined surfaces faces one of the light-emitting elements. A direction of each of the inclined surfaces in which an inclination angle is maximum intersects with the first direction.

According to an aspect, an illumination device includes: a plurality of light-emitting elements; a substrate on which the light-emitting elements are provided; and an optical member on which light from the light-emitting elements is incident. The light-emitting elements are arrayed on the substrate in a matrix. Two light-emitting elements adjacent to each other are arranged at a first interval in a first direction. The optical member has a plurality of inclined surfaces. One of the inclined surfaces faces one of the light-emitting elements in a one-to-one correspondence. The first interval is defined such that each of the light-emitting elements does not protrude from the inclined surface that the light-emitting element faces, in plan view.

DETAILED DESCRIPTION

Hereinafter, embodiments of the present invention will be described with reference to the drawings. What is disclosed herein is merely an example, and appropriate modifications within the gist of the invention at which those skilled in the art can easily arrive are reasonably encompassed in the range of the present invention. In the drawings, widths, thicknesses, shapes, and the like of the components can be schematically illustrated in comparison with actual modes for more clear explanation. They are however merely examples and do not limit interpretation of the present invention. In the present specification and the drawings, the same reference numerals denote components similar to those described before with reference to the drawing that has been already referred, and detail explanation thereof can be appropriately omitted.

In this disclosure, when an element is described as being "on" another element, the element can be directly on the other element, or there can be one or more elements between the element and the other element.

FIRST EMBODIMENT

Figure 1:
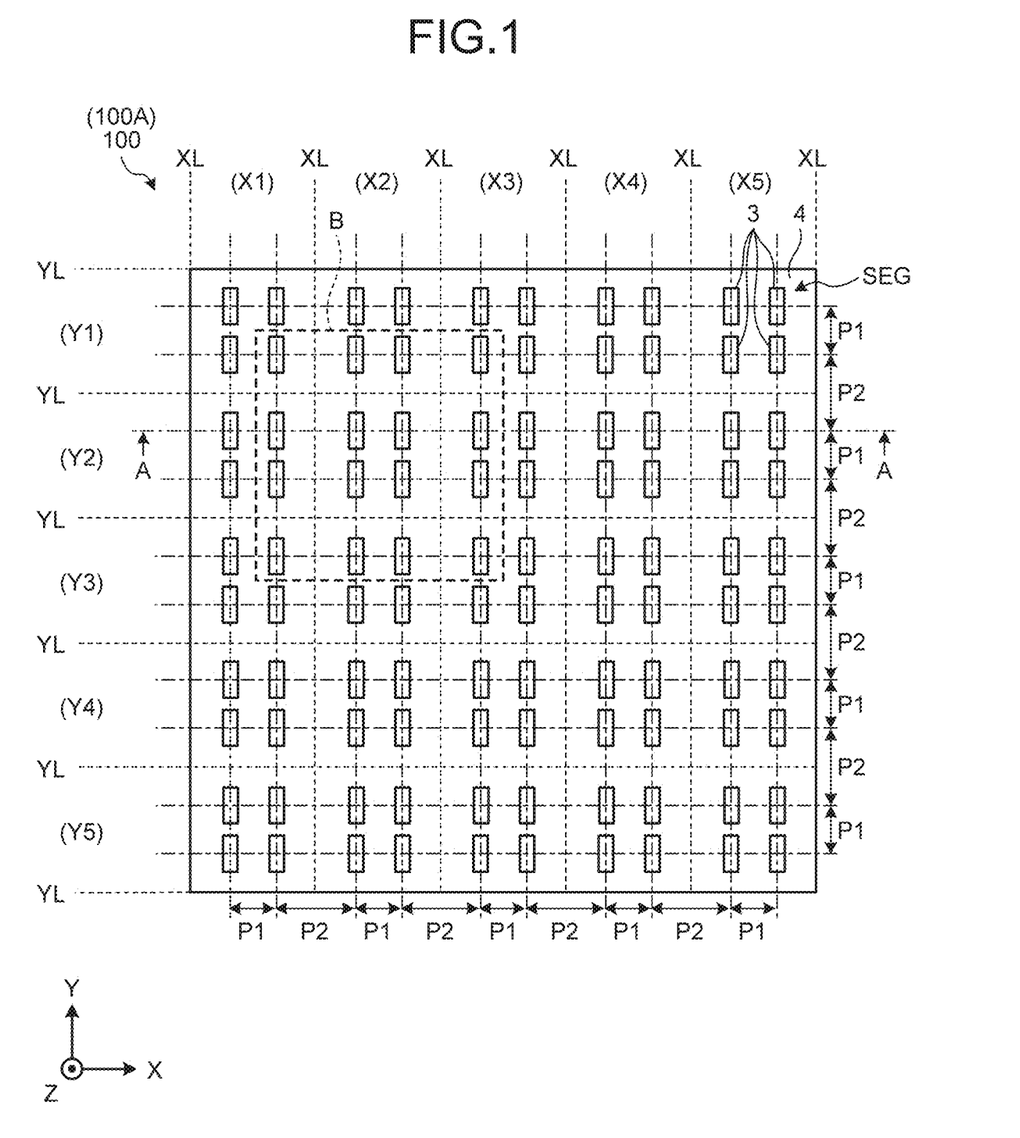
FIG. 1 is a diagram illustrating an arrangement of light-emitting elements included in an illumination device.

FIG. 1 is a diagram illustrating an arrangement of light-emitting elements 3 included in an illumination device 100 in a first embodiment and an illumination device 100A in a second embodiment, which will be described later. The illumination device 100 includes the light-emitting elements 3 and a substrate 4. The light-emitting elements 3 are, for example, light-emitting elements functioning as point light sources like light-emitting diodes (LEDs), and emit light in accordance with supply of electric power. To be more specific, each of the LEDs has a structure mounted as a semiconductor chip (bare chip) on the substrate 4, for example. The specific structure of the light-emitting element 3 is not limited thereto and may be a structure such as what-is-called a mini LED and a micro LED. Electric power is supplied to the light-emitting elements 3 through wiring of the substrate 4. A drive circuit (not illustrated) for the LEDs is coupled to the substrate 4. To be more specific, terminals are formed on the bottom surfaces of the light-emitting elements 3 and are coupled to the wiring of the substrate 4.

The light-emitting elements 3 in the first embodiment can be turned on and off individually under control of the drive circuit on a segment SEG basis, which will be described later. Brightnesses thereof in lighting can also be adjusted individually. The light-emitting elements 3 may be capable of being turned on and off individually, and the brightnesses thereof in lighting may be individually adjustable. The light-emitting elements 3 may be collectively controlled.

The light-emitting elements 3 are arrayed in a matrix with a row-column configuration along the substrate 4. Hereinafter, the array directions of the light-emitting elements 3 are an X direction and a Y direction. The X direction and the Y direction are orthogonal to each other. A surface of the substrate 4 on which the light-emitting elements 3 are arranged is along an X-Y plane. A direction orthogonal to the X-Y plane is a Z direction.

The illumination device 100 has the segments SEG. FIG. 1 illustrates, as one segment SEG, a rectangular region surrounded by a plurality of boundaries XL aligned so as to partition the substrate 4 in the X direction and a plurality of boundaries YL aligned so as to partition the substrate 4 in the Y direction. FIG. 1 illustrates positions of the segments SEG in a distinguishable manner by coordinates X1, X2, X3, X4, and X5 in the X direction, which are illustrated between the boundaries XL, and coordinates Y1, Y2, Y3, Y4, and Y5 in the Y direction, which are illustrated between the boundaries YL. The coordinates are expressed by a notation of (coordinate in the Y direction, coordinate in the Y direction). For example, an area B illustrated in FIG. 1 includes parts of the segments SEG of (X1, Y1), (X1, Y2), (X1, Y3), (X2, Y1), (X2, Y3), (X3, Y1), (X3, Y2), and (X3, Y3) with the segment SEG (X2, Y2) as a center.

Each segment SEG includes four light-emitting elements 3. The four light-emitting elements 3 included in one segment SEG are arranged in what-is-called a 2×2 array where two light-emitting elements 3 are aligned in the X direction and two light-emitting elements 3 are aligned in the Y direction. A pitch P1 between two light-emitting elements 3 adjacent to each other in each segment SEG is shorter than a pitch P2 between two light-emitting elements 3 adjacent to each other with the boundary XL or the boundary YL interposed therebetween. The pitches P1 and P2 are intervals between the centers of the two adjacent light-emitting elements 3 in X-Y plane view. The centers of the light-emitting elements 3 in X-Y plane view are centers of light-emitting points of the light-emitting elements 3 as the point light sources.

As a more specific structure example, each of the light-emitting elements 3 is a bare chip having a rectangular X-Y plane shape. Two sides among the four sides of the rectangular shape are along the X direction, and the other two sides thereof are along the Y direction. Longer sides (for example, the sides in the Y direction) of the sides of the rectangular shape each has a length less than 0.8 [mm]. The pitch P1 is, for example, 0.8 [mm]. The pitch P2 is, for example, 1.2 [mm]. One segment SEG has a square-shaped rectangular region each side of which is 2 [mm].

Figure 2:
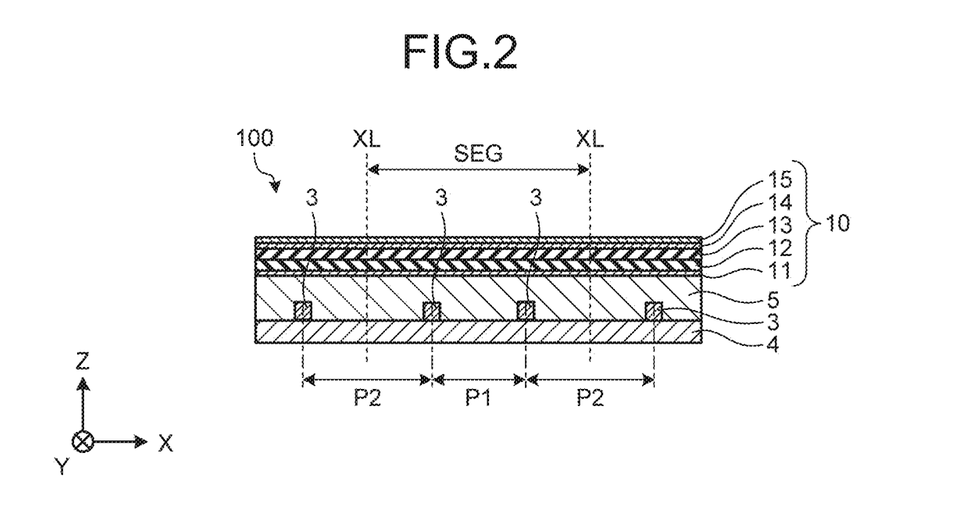
FIG. 2 is a cross-sectional view of an area B (see FIG. 1) in a first embodiment when cut along line A-A.

FIG. 2 is a cross-sectional view of the area B (see FIG. 1) in the first embodiment when cut along line A-A. A resin layer 5 is stacked on the surface of the substrate 4 on a side where the light-emitting elements 3 are provided (upper layer side). The resin layer 5 is a colorless synthetic resin layer having a light transmitting property and fixes the light-emitting elements 3 to the substrate 4 more securely. An optical sheet layer 10 is stacked on the upper layer side of the resin layer 5. The optical sheet layer 10 is a structure in which a plurality of optical sheets having different properties are stacked. The optical sheet layer 10 includes a quantum dot (QD) sheet 11, diffusion sheets 12 and 13, and prism sheets 14 and 15 that are stacked from the resin layer 5 side (lower layer side) toward the opposite side (upper layer side) thereto, for example.

The QD sheet 11 includes quantum dots emitting red light and green light by being irradiated with blue light. In the embodiment, the light-emitting elements 3 emit blue light. When the QD sheet 11 is irradiated with the blue light, the blue light is mixed with the red light and the green light emitted by the quantum dots of the QD sheet 11 to provide white light. The diffusion sheets 12 and 13 diffuse light from the light-emitting elements 3 that has passed through the QD sheet 11 and light that has emitted by the quantum dots of the QD sheet 11, toward the upper layer side. The prism sheets 14 and 15 diffuse light from the lower layer side more uniformly in X-Y plane view and guide the light to the upper layer side. In the embodiment, the thickness of the optical sheet layer 10 is, for example, 0.455 [mm] and is less than the pitch P1 (0.8 [mm]).

A structure including a display element that is illuminated by light from the illumination device 100, such as a liquid crystal display panel, is arranged on the upper layer side of the optical sheet layer 10.

SECOND EMBODIMENT

Figure 3:
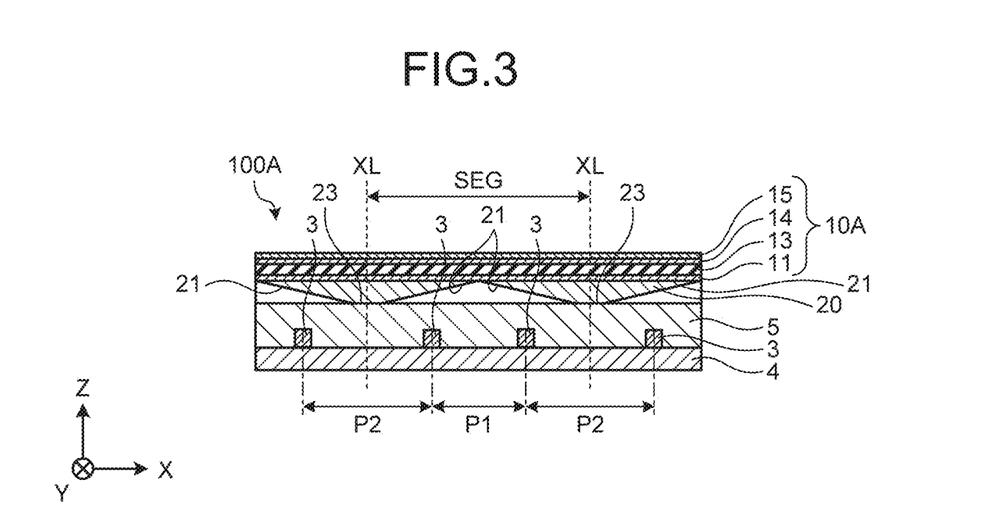
FIG. 3 is a cross-sectional view of the area B (see FIG. 1) in a second embodiment when cut along line A-A.

Hereinafter, the illumination device 100A in a second embodiment will be described with reference to FIG. 3. FIG. 3 is a cross-sectional view of the area B (see FIG. 1) in the second embodiment when cut along line A-A. The illumination device 100A in the second embodiment is similar to the illumination device 100 except that a structure included in a multilayered configuration in the Z direction are different from that in the illumination device 100 in the first embodiment. That is to say, the main structure of the illumination device 100A in X-Y plane view is similar to that of the illumination device 100 described with reference to FIG. 1.

The illumination device 100A includes an optical sheet layer 10A instead of the optical sheet layer 10 of the illumination device 100. The optical sheet layer 10A is similar to the optical sheet layer 10 except that the diffusion sheet 12 is omitted. The illumination device 100A includes a light guide member 20 provided between the resin layer 5 and the optical sheet layer 10A. The light guide member 20 is a colorless optical member having a light transmitting property and has a refractive index different from that of the air. As illustrated in FIG. 3, the light guide member 20 has inclined surfaces 21 intersecting with the X-Y plane and the Z direction.

Figure 4:
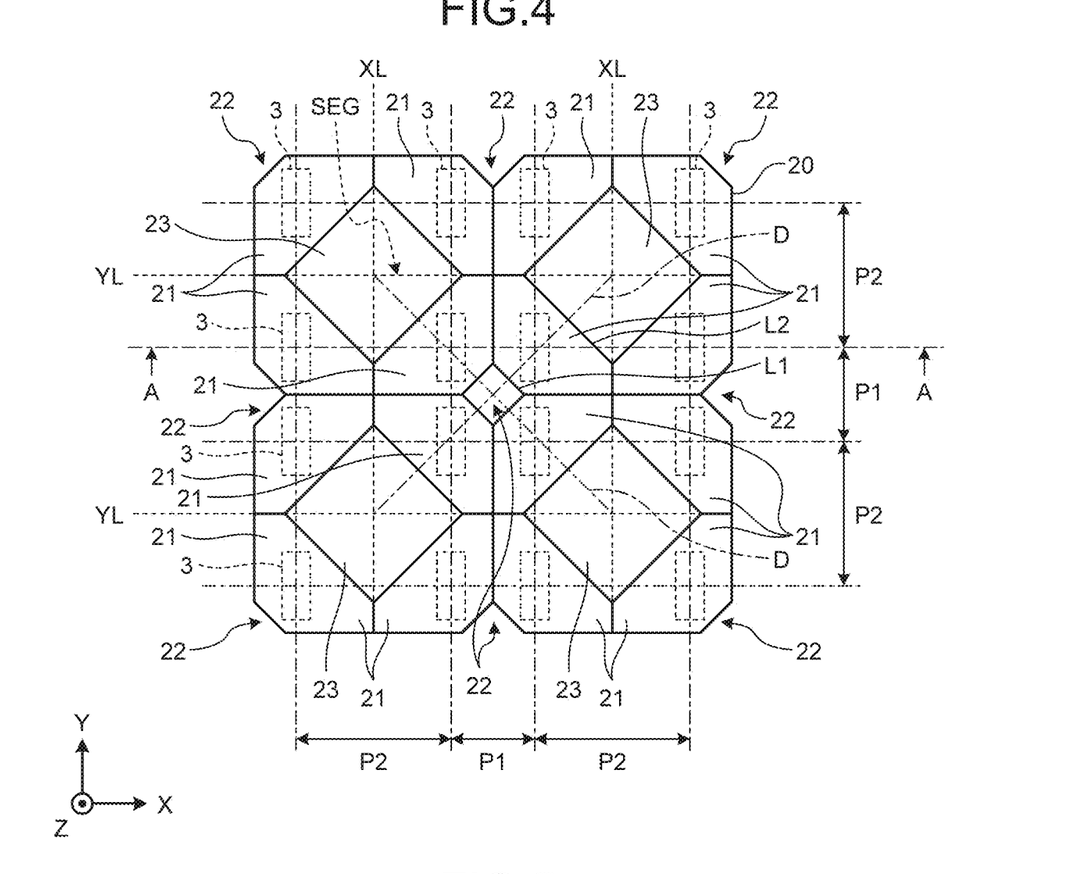
FIG. 4 is an X-Y plane view illustrating a positional relation of the light-emitting elements with inclined surfaces, openings, and planar portions of a light guide member, in the area B (see FIG. 1)

FIG. 4 is an X-Y plane view illustrating a positional relation of the light-emitting elements 3 with the inclined surfaces 21, openings 22, and planar portions 23 of the light guide member 20 in the area B (see FIG. 1). The openings 22 and the planar portions 23 will be explained first, prior to explanation of the inclined surfaces 21.

The openings 22 are holes penetrating through the light guide member 20 in the Z direction. One opening 22 is provided at the center of one segment SEG having a rectangular shape in X-Y plane view so as to be located at the center of the segment SEG overlapping with an intersection of two diagonal lines D of the segment SEG. Each opening 22 has a square shape in X-Y plane view. One set of two facing sides among the four sides of the square shape is orthogonal to one diagonal line D and is parallel with the other diagonal line D. The other set of two facing sides among the four sides of the square shape is orthogonal to the other diagonal line D and is parallel with the one diagonal line D.

Four planar portions 23 are arranged for one segment SEG having the rectangular shape in X-Y plane view such that the centers of the four planar portions 23 are located at the four vertices of the segment SEG, respectively. Each planar portion 23 has a square shape in X-Y plane view. One of the diagonal lines of the square shape overlaps with the boundary XL and the other thereof overlaps with the boundary YL.

Four inclined surfaces 21 are provided for one segment SEG. One inclined surface 21 is arranged so as to overlap with one light-emitting element 3 in X-Y plane view. One inclined surface 21 has a hexagonal shape in which two facing sides L1 and L2 are parallel to each other in X-Y plane view. One of two sides connecting one end of the side L1 and one end of the side L2 in the hexagonal shape is along the X direction and the other thereof is along the Y direction. The hexagonal shape is a linearly symmetrical shape with respect to the diagonal line D overlapping therewith in X-Y plane view as a center line. The side L1 overlaps with one of the four sides of the outer edge shape (square shape) of the opening 22 in X-Y plane view. The side L2 overlaps with one of the four sides of the outer edge shape (square shape) of the planar portion 23 in X-Y plane view. That is to say, the inclined surfaces 21 and the planar portions 23 are arranged outward from the center at which the opening 22 is provided in each segment SEG. The sides L1 of the four inclined surfaces 21 overlap with the four sides of the opening 22 having the square shape in X-Y plane view. At the center of 2×2 segments SEG in X-Y plane view, one planar portion 23 surrounded by the sides L2 of the inclined surfaces 21 of the different segments SEG is located. Each of the four inclined surfaces 21 faces another one of the four inclined surfaces 21 with the opening 22 interposed therebetween and is adjacent to two inclined surfaces 21 excluding the other one inclined surface 21.

The planar portions 23 at both ends of the light guide member 20 in the X direction have right-angled isosceles triangular shapes the bases of which are the boundaries XL at both ends. The planar portions 23 at both ends of the light guide member 20 in the Y direction have right-angled isosceles triangular shapes the bases of which are the boundaries YL at both ends. Each of four planar portions 23 at four corners of the light guide member 20 in X-Y plane view has a right-angled isosceles triangular shape the right-angled vertex of which corresponds to one of the four corners. Also in FIG. 4, the pitches P1 and P2 are intervals between the centers of the two adjacent light-emitting elements 3 in X-Y plane view. The pitch P1 is defined such that the diagonal lines D overlap with the centers (or pass through the vicinities of the centers) of the light-emitting elements 3. The center (or the vicinity of the center) of each light-emitting element 3 is placed to be closer to a corresponding one of the openings 22 than the intermediate point of a corresponding one of the diagonal lines D is, by making the pitch P1 shorter than the pitch P2. The light-emitting elements 3 do not protrude from the inclined surfaces 21 in X-Y plane view by forming the light-emitting elements 3 so as to be close to the openings 22 at the centers of the respective segments SEG. Since the light-emitting elements 3 do not protrude from the inclined surfaces 21, most of light emitted from the light-emitting elements 3 can be incident on the facing inclined surfaces 21.

Figure 5:
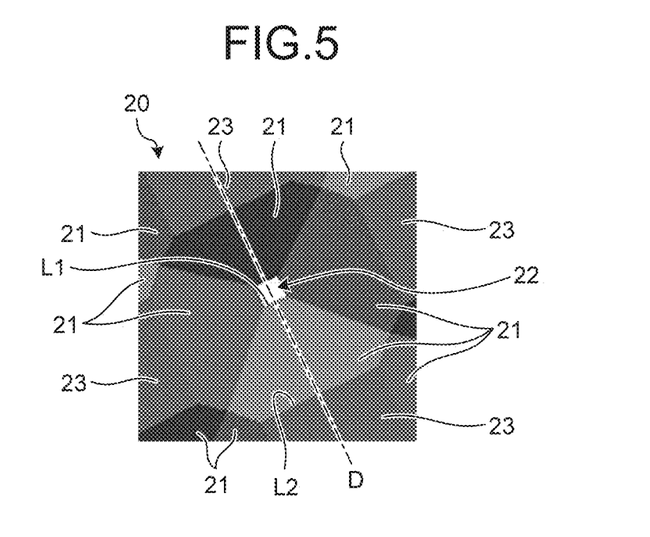
FIG. 5 is a perspective view illustrating inclinations of the inclined surfaces of the light guide member when the light guide member is seen from an upper layer side.

FIG. 5 is a perspective view illustrating inclinations of the inclined surfaces 21 of the light guide member 20 when the light guide member 20 is seen from the upper layer side. As illustrated in FIG. 3 and FIG. 5, each inclined surface 21 is inclined such that the opening 22 side thereof is on the upper layer side and the planar portion 23 side thereof is on the lower layer side. The inclination angle of one inclined surface 21 is maximum in the direction of the diagonal line D orthogonal to the side L1 and the side L2 of the one inclined surface 21. In other words, each inclined surface 21 is formed such that the inclination direction in X-Y plane view is along the diagonal line D.

The light guide member 20 is provided between the resin layer 5 and the optical sheet layer 10A as described above with reference to FIG. 3 to FIG. 5, so that light from the lower layer side can be diffused more uniformly in X-Y plane view and guided to the upper layer side. The combined thickness of the light guide member 20 and the optical sheet layer 10A is, for example, 0.480 [mm] and is slightly greater than the thickness (0.455 [mm]) of the optical sheet layer 10.

Although the configuration in the area B has been described above as an example with reference to FIG. 2 to FIG. 5, the segments SEG located at the other positions have similar configurations. The illumination device 100A is similar to the illumination device 100 other than the specially above-described matters.

Figure 6:
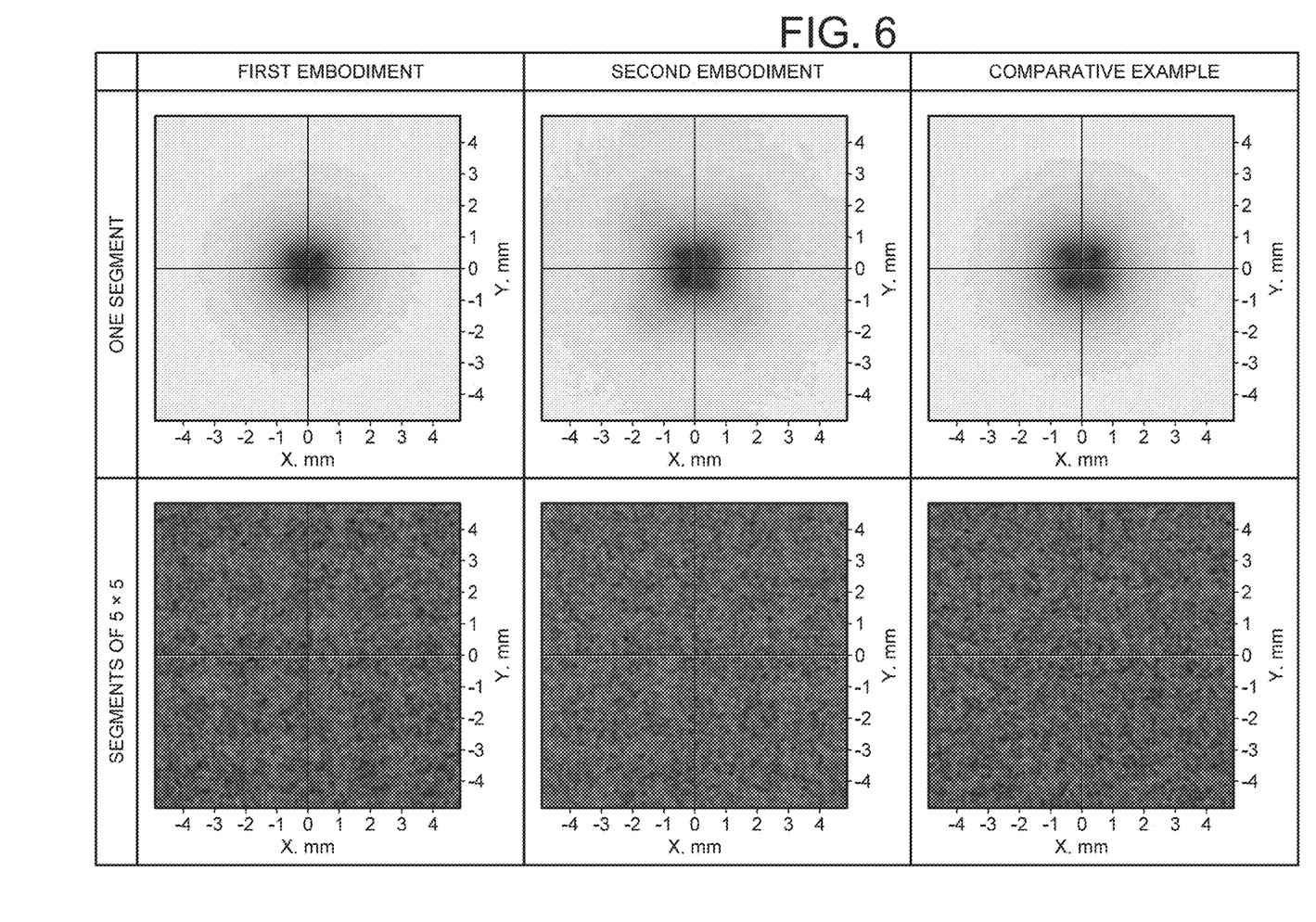
FIG. 6 is a table illustrating measurement results of luminance distributions in the first embodiment, the second embodiment, and a comparative example in one segment and 5×5 segments.

FIG. 6 is a table illustrating measurement results of luminance distributions in the first embodiment, the second embodiment, and a comparative example in one segment SEG and 5×5 segments SEG. The comparative example is similar to the first embodiment except that the pitch P1 and the pitch P2 are 1 [mm]. The luminance distribution illustrated in FIG. 6 is provided by measuring the luminance from the upper layer side in a state where all of the light-emitting elements 3 are caused to emit light with maximum luminance, and darker regions indicates higher luminance.

As indicated by the luminance distribution with one segment SEG, in the comparative example, the luminance at positions at which the four light-emitting elements 3 in one segment SEG are provided is significantly higher than that at the other positions, resulting in the occurrence of what-is-called prominent chips in which the positions of the light-emitting elements 3 become visible. In contrast, the first embodiment and the second embodiment can reduce the prominent chips in comparison with the comparative example.

According to the second embodiment, it is possible to make the luminance distribution in the entire region of the 5×5 segments more uniform than that in the first embodiment.

As described above, according to each of the embodiments, the illumination device includes the light-emitting elements 3 arranged in a matrix with a row-column configuration along the two directions (X direction and Y direction) orthogonal to each other, the substrate 4 on which the light-emitting elements 3 are provided, and a plurality of partial regions (segments SEG) partitioned into a matrix with a row-column configuration, in which each of the partial regions includes 2×2 light-emitting elements 3 arranged in a matrix with a row-column configuration, the pitch P1 between two light-emitting elements 3 adjacent to each other in each of the partial regions is shorter than the pitch P2 between two light-emitting elements 3 adjacent to each other with the boundary of the two adjacent partial regions interposed therebetween along one of the two directions. With the above-described configuration, the four light-emitting elements 3 in each of the partial regions (segment SEG) are arranged at closer positions, so that light emission from the four light-emitting elements 3 can function as planar light emission from the area in which the four light-emitting elements 3 are arranged. The prominent chips of the light-emitting elements 3 can thereby be reduced.

According to the second embodiment, the illumination device includes the light guide member 20 provided at a position facing the surface of the substrate 4 on which the light-emitting elements 3 are provided. The light guide member 20 has the inclined surfaces 21. Each of the inclined surfaces 21 is provided such that the thickness thereof in the direction (Z direction) in which the surface of the substrate 4 and the light guide member 20 face each other increases toward the outer side of the partial region (segment SEG) from the inner side thereof. One inclined surface 21 faces one light-emitting element 3, and the direction of each of the inclined surfaces 21 in which the inclination angle is maximum intersects with the two directions (X direction, Y direction). Light from the light-emitting elements 3 can thereby be diffused more uniformly by the arrangement direction (X-Y plane direction) of the light-emitting elements 3. Consequently, the luminance distribution of light from the illumination device 100A can be made more uniform.

A specific shape of the light guide member provided between the resin layer 5 and the optical sheet layer 10A like the light guide member 20 is not limited to the shape described with reference to FIG. 3 to FIG. 5. Hereinafter, modifications of the light guide member will be described with reference to FIG. 7.

Modifications

Figure 7:
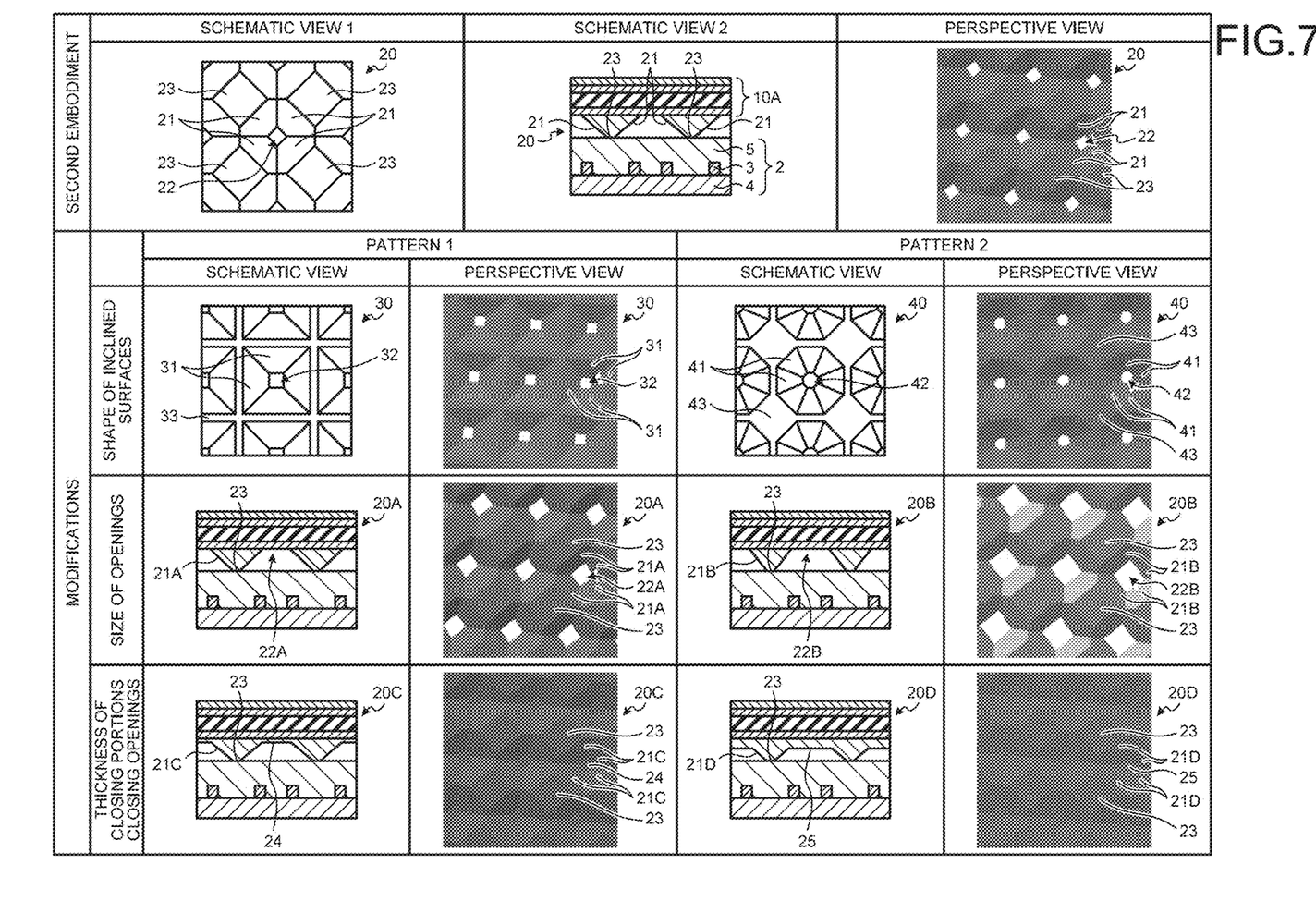
FIG. 7 is a table for explaining modifications of the light guide member.

FIG. 7 is a table for explaining modifications of the light guide member. In FIG. 7, a schematic view 1 (see FIG. 4), a second schematic view 2 (see FIG. 3), and a perspective view (see FIG. 5) that illustrate the shape of the light guide member 20 in the second embodiment described with reference to FIG. 3 to FIG. 5, are an example before modification; and views of modifications are examples after modification. The following describes the modifications by explaining difference between before and after modification. The modifications include a pattern 1 (light guide member 30) and a pattern 2 (light guide member 40) in which the inclined surfaces are different in shape from the light guide member 20, a pattern 1 (light guide member 20A) and a pattern 2 (light guide member 20B) in which and the openings 22 are different in shape from the light guide member 20, and a pattern 1 (light guide member 20C) and a pattern 2 (light guide member 20D) in which closing portions are provided to close the openings 22 in the light guide member 20.

The light guide member 30 has inclined surfaces 31, openings 32, and a planar portion 33. Positions of the openings 32 in the X-Y plane in the light guide member 30 are similar to those of the openings 22 in the light guide member 20. The X-Y planar shape of one opening 32 is, however, such a square shape that one set of two facing sides among the four sides is along the X direction and the other set thereof is along the Y direction. Four inclined surfaces 31 are provided around each opening 32 as a center. The X-Y planar shape of one inclined surface 31 is an isosceles trapezoid, and the short side thereof is one side of the opening 32. Each of the four inclined surfaces 31 is adjacent to two inclined surfaces 31 excluding one inclined surface 31 located at a facing position with the opening 32 therebetween. The boundary of the adjacent inclined surfaces 31 overlaps with the diagonal line D (see FIG. 4 and FIG. 5) of the segment SEG. That is to say, in the configuration in which the light guide member 30 is provided, the boundary of the adjacent inclined surfaces 31 and the light-emitting element 3 overlap with each other. The inclination direction of each inclined surface 31 is set such that the short side of the isosceles trapezoid is on the upper layer side and the longer side thereof is on the lower layer side.

As described above, in the modification including the light guide member 30 provided at the position facing the surface of the substrate 4 on which the light-emitting elements 3 are provided, the light guide member 30 has the inclined surfaces 31 provided such that the thicknesses thereof in the direction (Z direction) in which the surface of the substrate 4 and the light guide member 30 face each other increase toward the outer side of the partial regions (segments SEG) from the inner side thereof, and a direction in which the inclination angle of each inclined surface 31 is maximum is one of the two directions (X direction, Y direction).

The planar portion 33 is located between the adjacent segments SEG. The X-Y planar shape of the planar portion 33 is a lattice-like shape overlapping with the boundaries XL and YL (see FIG. 1) of the adjacent segments SEG.

The light guide member 40 has inclined surfaces 41, openings 42, and a planar portion 43. Positions of the openings 42 in the X-Y plane in the light guide member 40 are similar to those of the openings 22 in the light guide member 20. The X-Y planar shape of one opening 42 is, however, such a regular octagonal shape that one set of two facing sides among the eight sides is along the X direction, another set thereof is along the Y direction, and the other two sets thereof intersect with the X direction and the Y direction. Eight inclined surfaces 41 are provided around each opening 42 as a center. The X-Y planar shape of one inclined surface 41 is an isosceles trapezoid, and the short side thereof is one side of the opening 42. Each of the eight inclined surfaces 41 is adjacent to two inclined surfaces 41. The boundary of the adjacent inclined surfaces 31 intersects with the X direction and the Y direction. Two of the eight inclined surfaces 41 overlap with the boundaries XL (see FIG. 1 and FIG. 4) in X-Y plane view. Other two of the eight inclined surfaces 41 overlap with the boundaries YL (see FIG. 1 and FIG. 4) in X-Y plane view. The remaining four of the eight inclined surfaces 41 overlap with the light-emitting elements 3 in X-Y plane view. The inclined surfaces 41 overlapping with the boundaries XL (see FIG. 1 and FIG. 4) in X-Y plane view, the inclined surfaces 41 overlapping with the boundaries YL (see FIG. 1 and FIG. 4) in X-Y plane view, or both, may overlap with the light-emitting elements 3 located so as to extend from other inclined surfaces 41 in X-Y plane view. The inclination direction of each inclined surface 41 is set such that the short side of the isosceles trapezoid is on the upper layer side and the longer side thereof is on the lower layer side.

As described above, in the modification including the light guide member 40 provided at a position facing the surface of the substrate 4 on which the light-emitting elements 3 are provided, the light guide member 40 has the inclined surfaces 41 provided such that the thicknesses thereof in the direction (Z direction) in which the surface of the substrate 4 and the light guide member 40 face each other increase toward the outer side of the partial regions (segments SEG) from the inner side thereof, one light-emitting element 3 faces at least one inclined surface 41, and the directions of the inclined surfaces 41 in which the inclination angles are maximum include a direction intersecting with the two directions (X direction and Y direction).

The planar portion 43 is located between the adjacent segments SEG. The X-Y planar shape of the planar portion 43 is a lattice-like shape overlapping with the boundaries XL and YL (see FIG. 1) of the adjacent segments SEG, and the intersections of the lattice each have a shape enlarged in a form of a square shape. Four sides of the square shape intersect with the X direction and the Y direction.

The light guide member 20A has openings 22A provided by increasing the size of the openings 22 in X-Y plane view in the light guide member 20. Since the size of the openings 22A is larger than that of the openings 22, a pitch between the opening 22A and the planar portion 23 in X-Y plane view is narrowed. Consequently, the inclination of inclined surfaces 21A corresponding to the inclined surfaces 21 in the light guide member 20 is steeper with respect to the X-Y plane.

The light guide member 20B has openings 22B provided by increasing the size of the openings 22 in X-Y plane view in the light guide member 20 to be much larger than the size of the openings 22A. Since the size of the openings 22B is much larger, a pitch between the opening 22B and the planar portion 23 in X-Y plane view is narrowed. Consequently, the inclination of inclined surfaces 21B corresponding to the inclined surfaces 21 in the light guide member 20 is much steeper with respect to the X-Y plane. As described above with reference to the light guide member 20A and the light guide member 20B, the inclined surfaces have any desired inclination angles.

The light guide member 20C includes closing portions 24 closing the openings 22 in the light guide member 20. Including the closing portions 24 closing the openings 22 allows distances between the closing portions 24 and the planar portions 23 to be shorter than distances between the openings 22 and the planar portions 23. Consequently, the inclination lengths of inclined surfaces 21C corresponding to the inclined surfaces 21 in the light guide member 20 are shorter than those of the inclined surfaces 21.

The light guide member 20D includes closing portions 25 closing the openings 22 in the light guide member 20. The thicknesses of the closing portions 25 are greater than those of the closing portions 24. Including the closing portions 25 having the greater thicknesses causes distances between the closing portions 25 and the planar portions 23 to be shorter than the distances between the closing portions 24 and the planar portions 23. Consequently, the inclination lengths of inclined surfaces 21D corresponding to the inclined surfaces 21 in the light guide member 20 are much shorter than those of the inclined surfaces 21C. As described above with reference to the light guide member 20C and the light guide member 20D, the closing portions have any desired thicknesses.

The configurations in the modifications are similar to the configuration of the illumination device 100A except for the specially above-described matters. The modifications provide effects similar to the effects that are provided by the second embodiment.

Other action effects provided by the aspects described in the present embodiment that are obvious from description of the present specification or can be thought of by those skilled in the art should be interpreted to be provided by the present disclosure.

What is claimed is:

1. An illumination device comprising:
a plurality of light-emitting elements arrayed in a matrix along two directions;
a substrate on which the light-emitting elements are provided; and
an optical member provided at a position facing a surface of the substrate on which the light-emitting elements are provided, wherein
the substrate has a plurality of partial regions,
the light-emitting elements are arranged in the partial regions such that four light-emitting elements are arrayed in a two-by-two matrix along the two directions in each of the partial regions,
two light-emitting elements adjacent to each other in each of the partial regions are arranged at a first interval in one direction of the two directions,
two light-emitting elements adjacent to each other with a boundary of two partial regions adjacent to each other along the one direction interposed therebetween are arranged at a second interval in the one direction, and
the first interval is shorter than the second interval,
the optical member has a plurality of inclined surfaces provided such that thicknesses of the inclined surfaces in a direction in which the surface and the optical member face each other increase toward an outer side of the partial regions from an inner side thereof,
one light-emitting element faces at least one inclined surface, and
directions of the inclined surfaces in which inclination angles are maximum include a direction intersecting with the two directions.

2. An illumination device comprising:
a plurality of light-emitting elements arrayed in a matrix along two directions;
a substrate on which the light-emitting elements are provided; and
an optical member provided at a position facing a surface of the substrate on which the light-emitting elements are provided, wherein
the substrate has a plurality of partial regions,
the light-emitting elements are arranged in the partial regions such that four light-emitting elements are arrayed in a two-by-two matrix along the two directions in each of the partial regions,
two light-emitting elements adjacent to each other in each of the partial regions are arranged at a first interval in one direction of the two directions,
two light-emitting elements adjacent to each other with a boundary of two partial regions adjacent to each other along the one direction interposed therebetween are arranged at a second interval in the one direction,
the first interval is shorter than the second interval, the optical member has a plurality of inclined surfaces provided such that thicknesses of the inclined surfaces in a direction in which the surface and the optical member face each other increase toward an outer side of the partial regions from an inner side thereof, and
a direction of each of the inclined surfaces in which an inclination angle is maximum is one of the two directions.

* * * * *